United States Patent [19]
Koeijmans

[11] 3,742,289
[45] June 26, 1973

[54] VIDEO DISPLAY SYSTEM CREATING BOTH HORIZONTAL AND VERTICAL SYNC PULSES FROM THE DISC TIME TRACK

[75] Inventor: Gerard D. Koeijmans, Dallas, Tex.
[73] Assignee: Mobil Oil Corporation, Dallas, Tex.

[22] Filed: Oct. 30, 1970
[21] Appl. No.: 85,761

Related U.S. Application Data

[63] Continuation of Ser. No. 812,213, April 1, 1969, abandoned.

[52] U.S. Cl. .......... 315/18, 340/172.5
[51] Int. Cl. .......... H01j 29/70
[58] Field of Search .......... 315/22, 18, 19; 340/324 AD, 172.5

[56] References Cited

UNITED STATES PATENTS

| | | | |
|---|---|---|---|
| 3,205,344 | 9/1965 | Taylor et al. | 340/324 X |
| 3,344,407 | 9/1967 | Koeijmans | 340/15.5 X |
| 3,411,145 | 11/1968 | Cragon et al. | 340/15.5 X |

OTHER PUBLICATIONS

Magnetic Disc + TV Monitors = Low Cost Graphic Display Terminals "Information Display" January/February 1968, p. 45.

Hill, Design Features of a Magnetic Drum Information Storage System, Assn. for Computing Machinery Conf., 1950.

*Primary Examiner*—Carl D. Quarforth
*Assistant Examiner*—J. M. Potenza
*Attorney*—William S. Scherback et al.

[57] ABSTRACT

The video display system described consists of a digital disc which can store at least three seismic cross sections and a high resolution TV monitor. The monitor can show a cross section of 480 traces with 500 five-bit samples per trace. The electronic parts of the system control the flow of data to and from a computer through an interface controller. A high-speed D/A converter changes the digital seismic data into an analog video signal, and an external core memory is used to "bridge" the various speeds with which data flow from one point to another in the system. A graphical input device can be used to draw zones on the displayed cross section. This system can be an integral part of a complete computer graphics system.

5 Claims, 16 Drawing Figures

VIDEO DISPLAY SYSTEM CREATING BOTH HORIZONTAL AND VERTICAL SYNC PULSES FROM THE DISC TIME TRACK

This case is a continuation of Ser. No. 812,213 filed Apr. 1, 1969, now abandoned.

BACKGROUND OF THE INVENTION

1. Field of the Invention

This invention relates to video display of data and more particularly to a novel and improved system for displaying data with an intensity modulated raster scan. The invention has particular application to the display of geophysical data and especially seismic data and will be so described by way of example in the following.

2. Description of the Prior Art

In this era of computer technology, it has been found desirable to have a human operator interact with and communicate with a computer to optimize certain processing and control operations. For example, in the processing of geophysical data it is found desirable to have a geophysicist monitor certain processing operations being performed by a digital computer and choose alternative processing procedures in accordance with the results produced on the data being processed. An example of this type of man-machine interactive processing is described in The Journal of the Society of Information Display, Jan./Feb., 1969, "Computer Graphics and Manufacturing".

The state-of-the-art technique for displaying data in a man-machine interactive communication system is by use of what is called a "vectorscope . An example of such a display is described in The Journal of the Society of Information Display, Nov./Dec., 1968, "An Interactive Graphics Pattern Recognition System". The conventional vectorscope type of display requires scanning of an electron beam in a cathode ray tube type display under program control which must be regenerated each time a display scan is refreshed. This inherently makes the vectorscope type of display currently available more complex and thus more expensive to produce and susceptible of malfunction.

BRIEF DESCRIPTION OF THE INVENTION

The present invention provides a novel and improved video display system which may be incorporated in an overall computer graphics system with man-machine interactive communication. The invention enables video display systems to be built at much more economical cost than heretofore by use of the principle of raster scan displays. A cathode ray tube display device having means for sweeping an electron beam in a raster scan can be driven by a cyclical storage device such as a drum or disc. The expensive vectorscope generators of the prior art need not be used in accordance with the present invention because a cyclical storage device of relatively inexpensive cost is used to generate an intensity modulated display on a cathode ray tube device and provides sync signals for synchronizing the raster scan display.

A digital-to-analog converter coupled to the cyclical storage device provides an analog video signal for intensity modulating the cathode ray beam of the display device.

An interface controller provides for controlling the timing of the various components of the video display system. It includes a memory which receives data from a data source such as a digital computer. A sector address register, a sector counter, and a comparator determine coincidence between the sector address selected by the data source and the sector location in the cyclical storage device. When the comparator signals coincidence between the sector address register and the sector counter, data are transferred from the memory in the interface controller to the cyclical storage device.

The cyclical storage device can be so designed in accordance with this invention to record and reproduce data to be displayed on multiple display monitors. This is particularly useful in a system for processing geophysical data where different monitors may be used to display geophysical data processed through different procedures.

DESCRIPTION OF A SPECIFIC EMBODIMENT

As a vehicle for explaining the invention, a specific embodiment of the invention will now be described with reference to the accompanying drawings. Specific components and specifications will be given in the following by way of illustration and not limitation.

Figure 1:
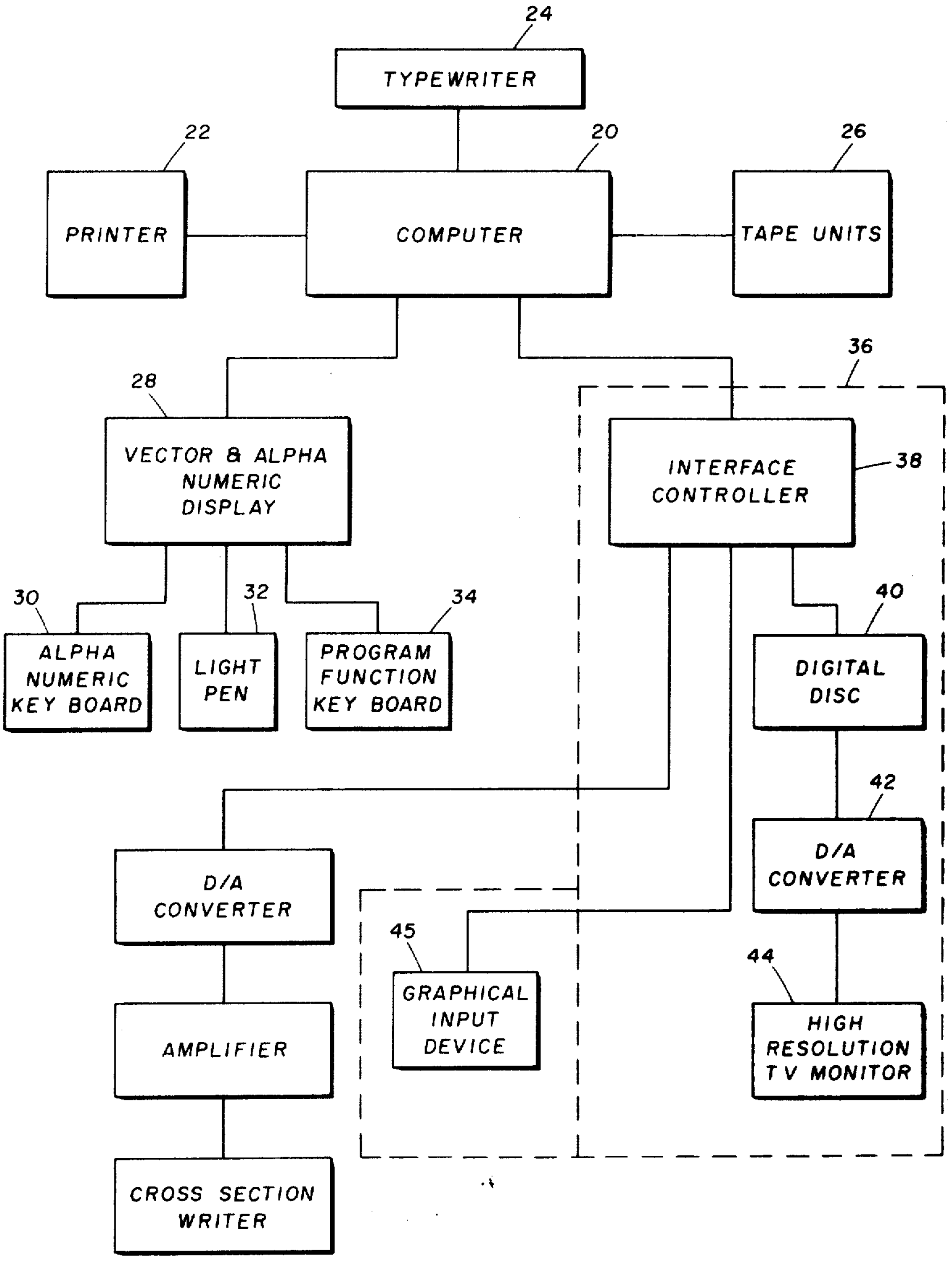
FIG. 1 is a block diagram of an overall computer graphics system embodying the invention.

FIG. 1 shows an overall computer graphics system capable of man-machine interactive communication. The conventional components of a computer system are illustrated to include a digital computer 20 serviced by the peripheral units of a printer 22, a typewriter 24, and magnetic tape units 26. The conventional vector display unit described above is designated as 28, together with its associated alphanumeric keyboard 30, light pen 32, and program function keyboard 34. A video display system 36 embodying the present invention is shown in block diagram within the dashed line.

The video display system 36 can be described in terms of the following main components:

A. An interface controller 38

B. A digital disc 40 which is a specific type of cyclical storage device

C. A D/A converter 42

D. A high resolution TV type monitor 44 which is a specific type of cathode ray tube display device E. A graphical input device 45

Figure 2:
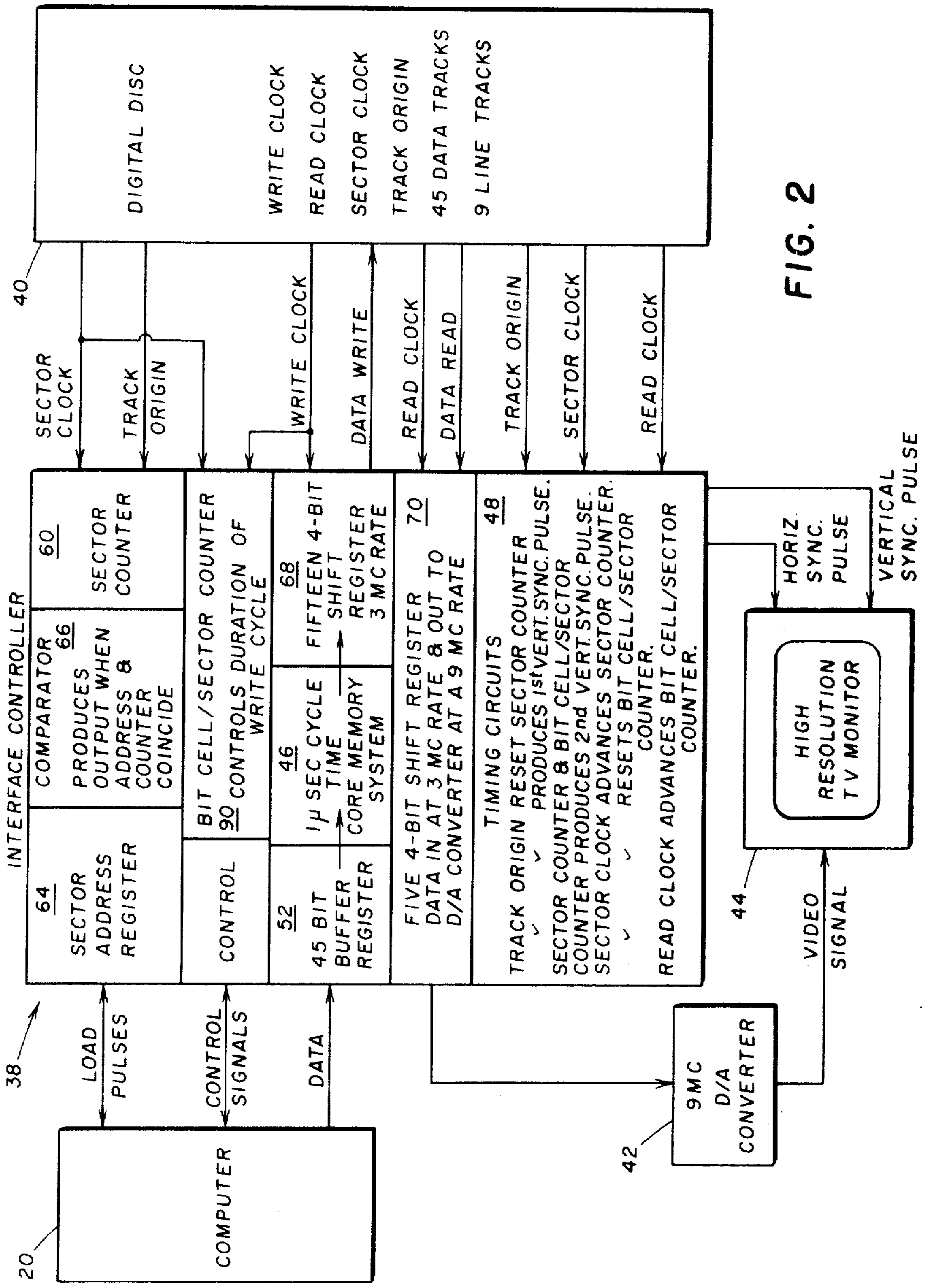
FIG. 2 is a block diagram of the video display system portion of a computer graphics system embodying the invention.

The video display system 36 is briefly described in FIG. 2 of the drawings. Further details of each of the components will be described in the following.

A. The Interface Controller

The controller 38 can be considered in several different parts, namely:

1. A write cycle part
2. A read cycle part
3. A core memory system 46
4. Timing and control circuits 48

1. The Write Cycle Part

Figure 3:
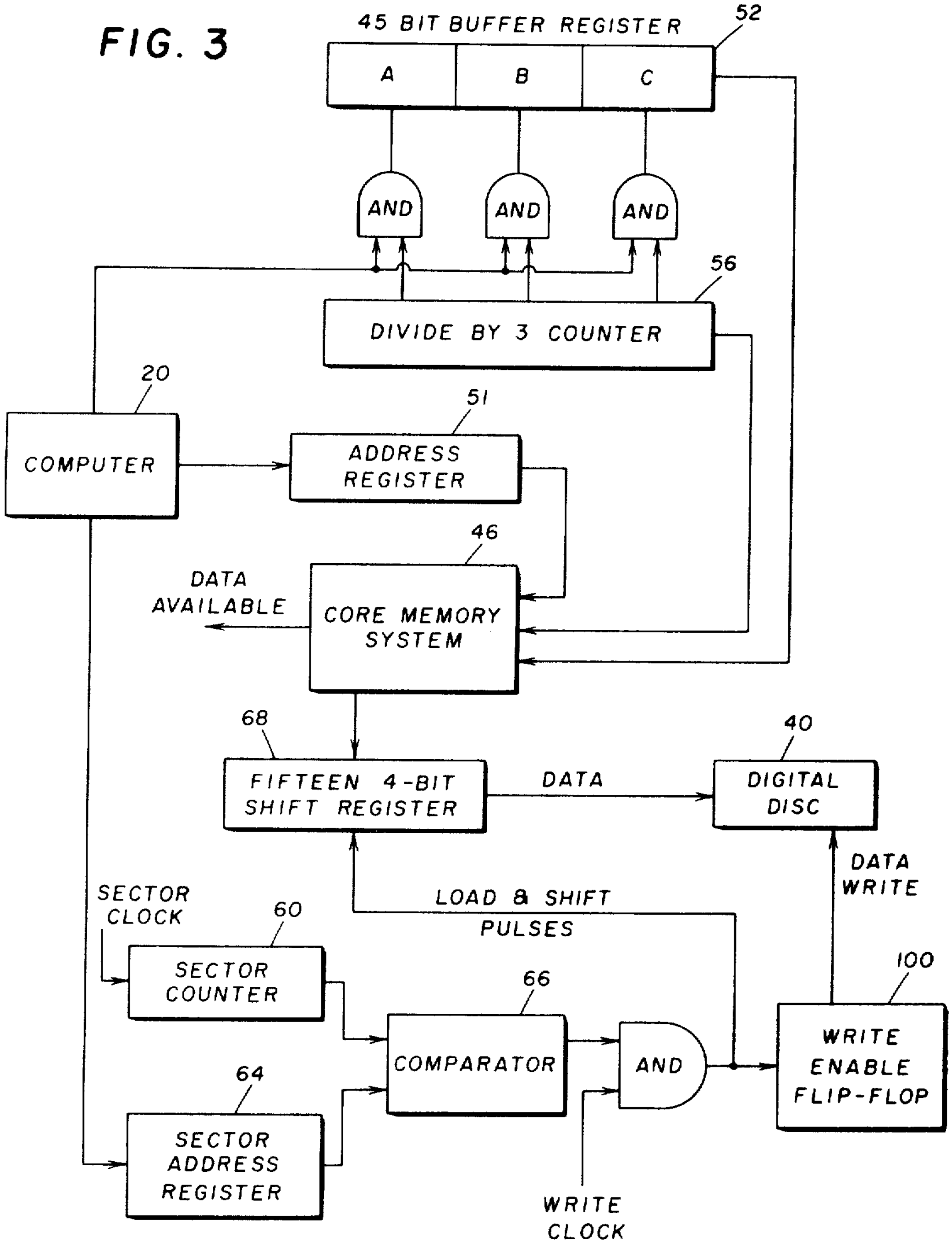
FIG. 3 is a block diagram of the write cycle part of the interface controller of FIG. 2.

The controller 38 must instruct the computer 20 when and where to store the data in the core memory system 46 (FIG. 3), when and where to take this stored data in core memory system 46 and store it on the disc 40. Once the data have been stored on the disc 40, the display on the TV monitor 44 will be automatically generated and refreshed periodically. The controller will shape the various pulses to the necessary requirements and time these pulses with respect to each other. Counter, comparators, and delay lines used with integrated circuits make up the logic circuits. FIG. 3 shows a block diagram of the circuits involved to record a trace on the digital disc.

First of all, we have to store the trace in the core memory system 46. So the computer 20 must select the controller 38 and place the memory system 46 in the write cycle mode. The computer 20 must also load a start address into address register 51. The controller 38 will automatically shift from random addressing mode to sequential addressing mode at the proper time. This way, the computer 20 needs to give only a start address and all the other addresses will come sequentially. After the computer 20 has loaded the start address into address register 51, it will load the first 15-bit word of data in part A of the 45-bit register 52; then the second 15-bit word of data in part B of register 52; and the third 15-bit word of data in part C of the register 52.

After register 52 has been filled, the divide-by-3 counter 56 will signal the core memory system 46 to store this 45-bit word at the core storage location designated by the start address. Then, the controller 38 will switch the memory system 46 from the random addressing mode to the sequential addressing mode. Next, the cycle described above will be repeated until all samples of trace no. 1 are stored in the core memory system 46.

Figure 6:
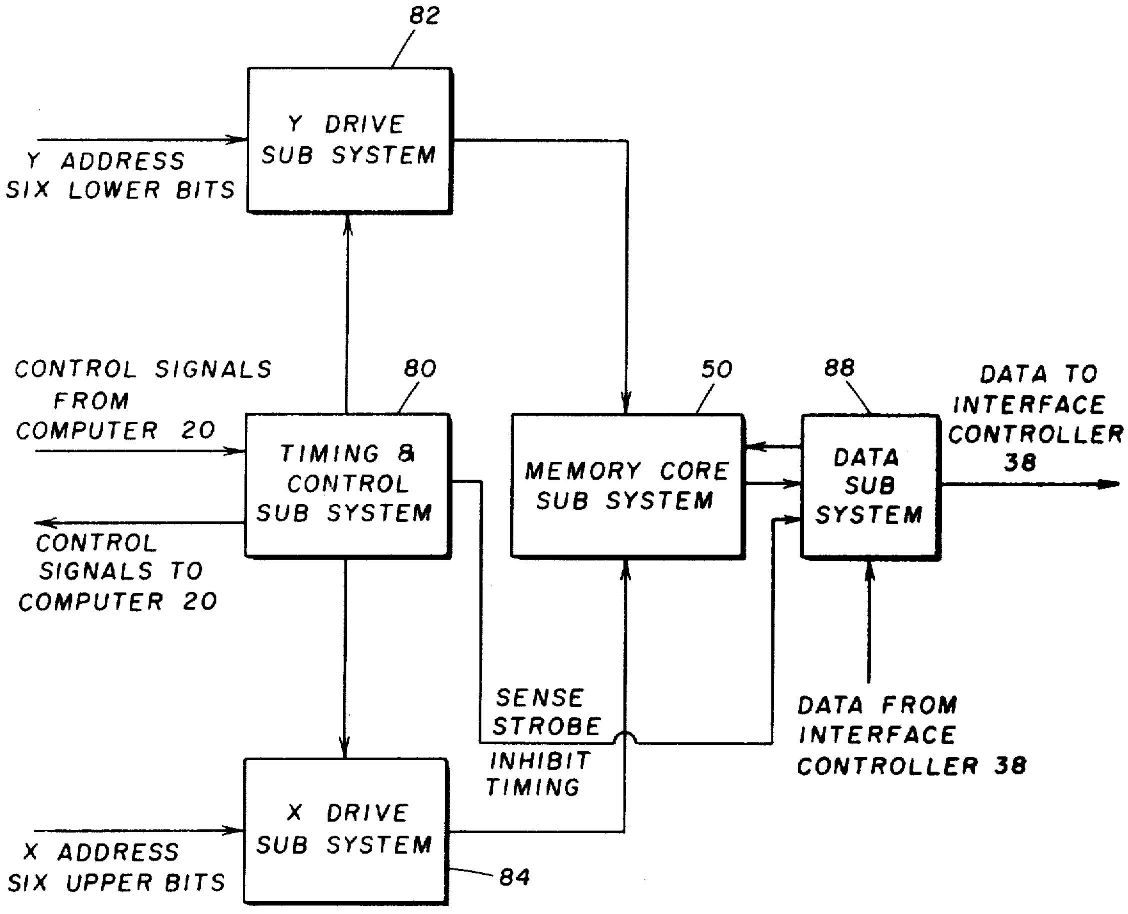
FIG. 6 is a block diagram of the core memory system.

Now that a trace has been stored in a core memory 50 shown in FIG. 6, this information must then be recorded in the proper sector of the digital disc 40.

The computer 20 again must select the core memory 50 shown in FIG. 6, which must be in the read/restore mode. Again, we must have a start address and again the random mode must be switched to the sequential mode at the proper time. The computer 20 must also select the sector address and place the digital disc 40 in the write mode. When the output of the sector counter 60 is the same as the sector address register 64, the comparator 66 will produce a logical "1" which will enable the digital disc 40 to record data. The load pulses created from the write clock track of disc 40 will cause a 45-bit word of data to be loaded from the core memory system 46 into the fifteen 4-bit shift registers 68. For every three write clock cycles, one load pulse and three shift pulses are generated.

The reason for having these shift registers and 45-bit words is that the write clock signal has a frequency of 3MC but the cycle time for the core memory system 46 is 1 microsecond. Since the digital disc 40 requires information to be recorded at three times the speed of the core memory system 46, the core memory 50 shown in FIG. 6 supplies three 15-bit words at a time.

Figure 4:
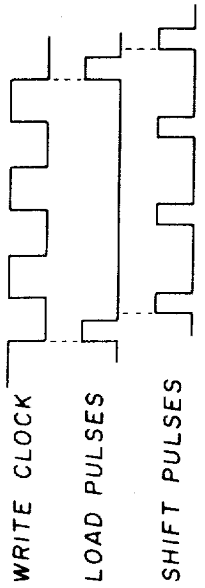
FIG. 4 is a time diagram of the waveforms for the write clock, load pulses, and shift pulses.
Figure 7:
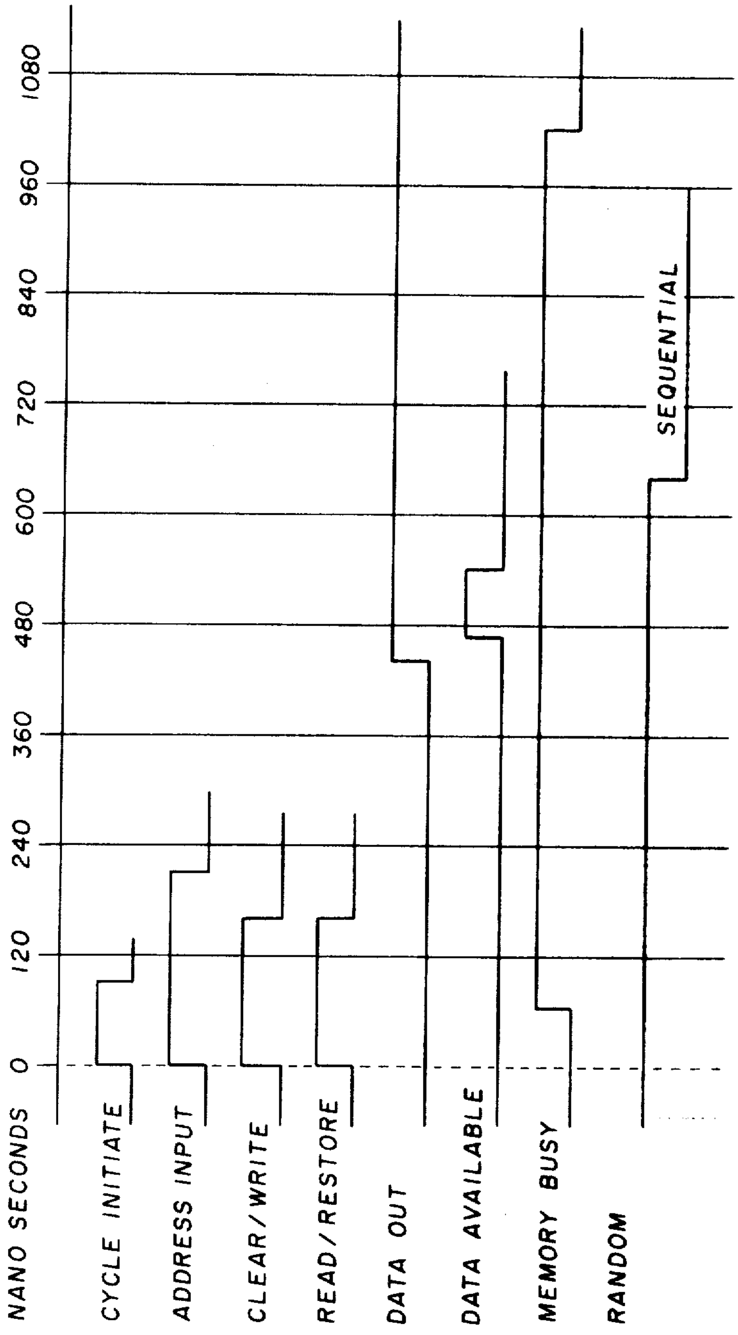
FIG. 7 is a time diagram of the waveforms for the various signals listed in Tables 1 and 2.

FIG. 4 shows the time relationship of the write clock, load, and shift pulses.

The load pulses initiate the read/restore cycle in the core memory system 46 which places another 45-bit word on the line to the fifteen 4-bit shift registers 68. This cycle will be repeated until all samples for that trace are recorded.

We are now ready for the second trace to be read out of the computer 20 into the core memory system 46 and repeat these cycles until all the traces have been recorded on the digital disc 40.

2. The Read Cycle Part

The read cycle part is not under program control, but will cause the data to be displayed at all times except when new data is being written on the disc 40.

The read clock signal has the same frequency as the write clock signal so the digital disc 40 supplies the five 4-bit shift registers 70 with three 5-bit words every ⅓ microsecond. The output of the shift register 70, however, is a 5-bit word sample and, therefore, nine samples are read out every microsecond. In order to display 500 samples per trace, we need $500/9 \approx 56$ microseconds of time. The duration of each horizontal sweep of a standard TV monitor is approximately 62.5 microseconds, so we have just enough time to display these 500 samples and still have enough time left for retrace. The read clock signal is used to generate load and shift pulses to take the data off the disc and feed these 5-bit samples to the D/A converter 42.

For every cycle of the read clock signal, one load pulse is generated and three shift pulses.

Figure 5:
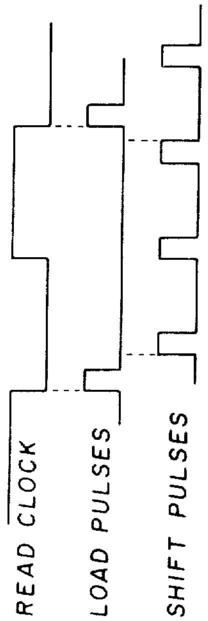
FIG. 5 is a time diagram of waveforms for the read clock, load pulses, and shift pulses.

FIG. 5 shows the time relationship between these pulses.

The 5-bit samples going into the D/A converter 42 are changed into a continuous analog video signal.

All that is necessary to make the picture on the TV monitor 44 appear to be stationary to the eye is the creation of sync pulses for the monitor. Each group of three 5-bit samples is read off the digital disc 40 in the midpoint of each cycle of the read clock signal. For each cycle of the read clock signal, one load pulse and three shift pulses are produced and for each 190 cycles of the read clock signal, a sector clock pulse has been produced and recorded on the disc 40. The track origin pulse is the clock source for all timing circuits so the disc 40 can supply the monitor 44 with the necessary horizontal and vertical sync pulses to "lock the picture in".

3. The Core Memory System

The core memory system 46 is a Lockheed Model CE-124-LT memory system. Two of these systems are connected together to form a 4K × 48 bit memory because the largest number of bits per word is only 36, and the required word length is nine samples (45-bit). The system consists of a ferrite core stack, X and Y drivers, sync switches, inhibit drivers, sense amplifiers, timing control, and address and data registers.

As shown in FIG. 6, the memory system 46 is functionally organized into five subsystems; these are the timing and control subsystem 80, Y-drive 82, X-drive 84, the core memory 50, and the data subsystem 88.

The memory system 46 has two modes of operation:

1. Clear/Write Mode

During the clear/write mode, an address is selected and data is applied to the core memory 50 for storage. The selected location is cleared of existing content by a read operation and new data is stored by a write operation. A clear/write cycle period is 1.0 microsecond.

2. Read/Restore Mode

During the read/restore mode, an address is selected, and the contents of the selected location are read and stored in the data register during the read operation. The contents of the data subsystem 88 are then available to the computer 20 and the data are rewritten into the original memory location during the write/restore operation.

The signals required to control the modes of operation of the memory system 46 can be split into two groups. One group consists of signals supplied by the controller 38, and the other group consists of signals supplied to the controller 38.

TABLE 1 below lists the signals supplied by the controller 38 and their functions.

TABLE 1

| Signal | Function |
|---|---|
| Address | 6 upper bits determine X location<br>6 lower bits determine Y location |
| Data | 48 bits in all can be recorded simultaneously in one core location |
| Enable | A high signal enables the memory system **46**<br>A low signal disables the memory system **46** |
| Cycle Initiate | This signal starts the memory cycle |
| Read/Restore | This signal sets memory in read/restore mode |
| Clear/Write | This signal sets memory in clear/write mode |
| Random/Sequential | This mode changes the random addressing mode to sequential |

TABLE 2 lists the signals supplied to the controller 38 together with their functions.

TABLE 2

| Signal | Function |
|---|---|
| Data | 48-bits are read out simultaneously from core locations |
| Data Available | This signal indicates to the controller **38** that data is available in the data subsystem **88**. |
| Memory Busy | This signal indicates to the controller **38** that the memory system is busy processing data. New operating cycles should not be initiated by the controller **38** while receiving memory busy. |

4. Timing and Control Circuits

To bridge the time gap between the data rate coming from the computer 20 and that same data being stored in the core memory system 46 of the controller 38, we need a buffer register 52 and control timing circuits.

The computer 20 reads out 3 samples (15 bits) at a time, but the word format for the core memory system 46 is 9 samples (45 bits) in parallel.

The timing circuitry 48 during the read cycle of the digital disc 40 is the most critical because of the high speed of operation (9 MC). The timing diagrams for the write and read cycles are shown respectively in FIGS. 4 and 5.

TABLE 3 below lists the various pulses and the frequencies at which they occur.

| | |
|---|---|
| Write Clock | 2.9925 MC |
| Read Clock | 2.9925 MC |
| Load Pulses (Write Cycle) | 0.9975 MC |
| Load Pulses (Read Cycle) | 2.9925 MC |
| Shift Pulses (Write Cycle) | 2.9925 MC |
| Shift Pulses (Read Cycle) | 8.9775 MC |
| Sector Pulses | 15,750 pps |
| Track Origin Pulses | 30 pps |
| Horizontal Sync Pulses | 15,750 pps |
| Vertical Sync Pulses | 60 pps |

Figure 8:
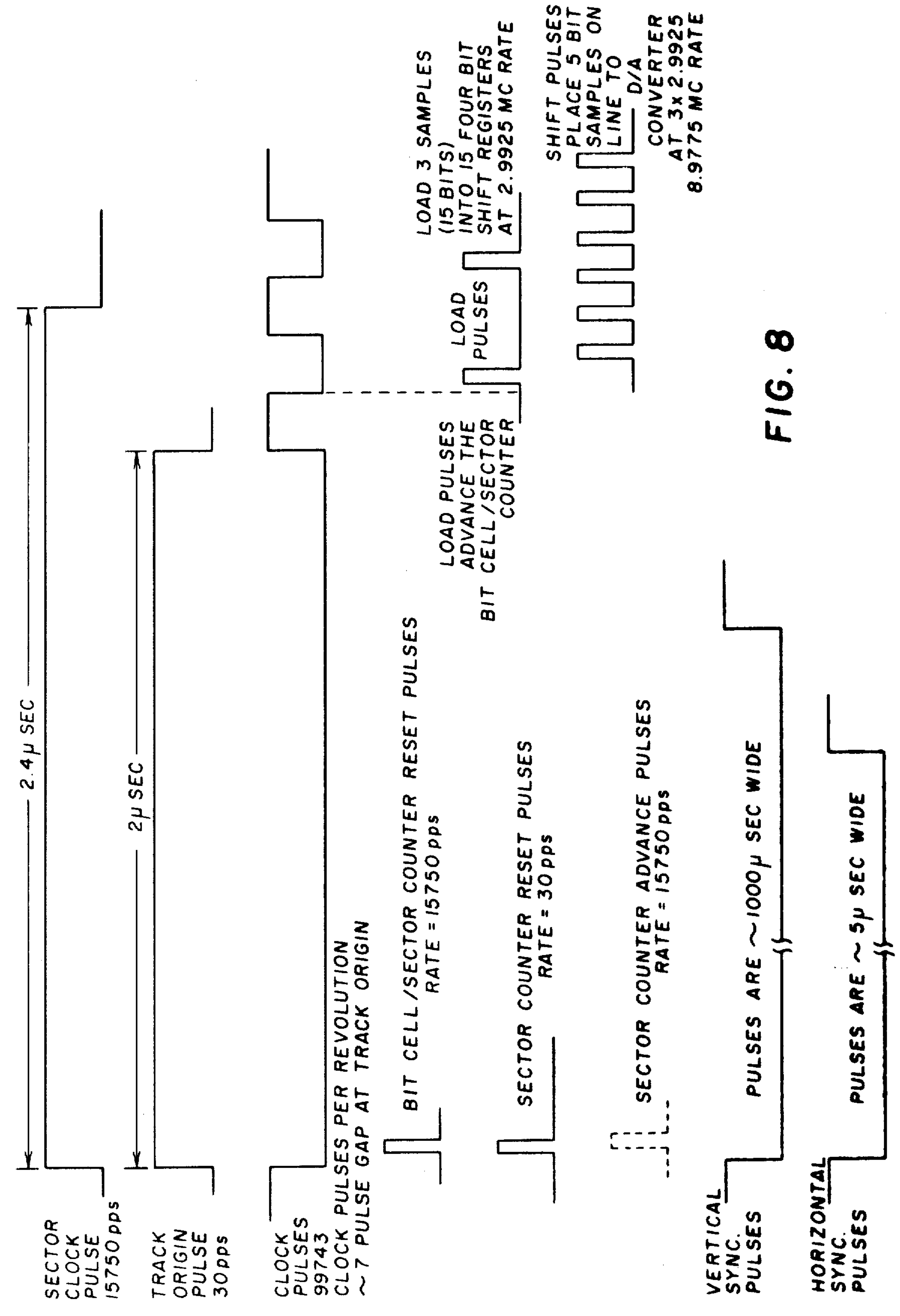
FIG. 8 is a time diagram of the waveforms for the various signals listed in Table 3 at the start of a revolution of the digital disc.

FIG. 8 shows the timing diagram at the start of a revolution of the disc 40.

Figure 9:
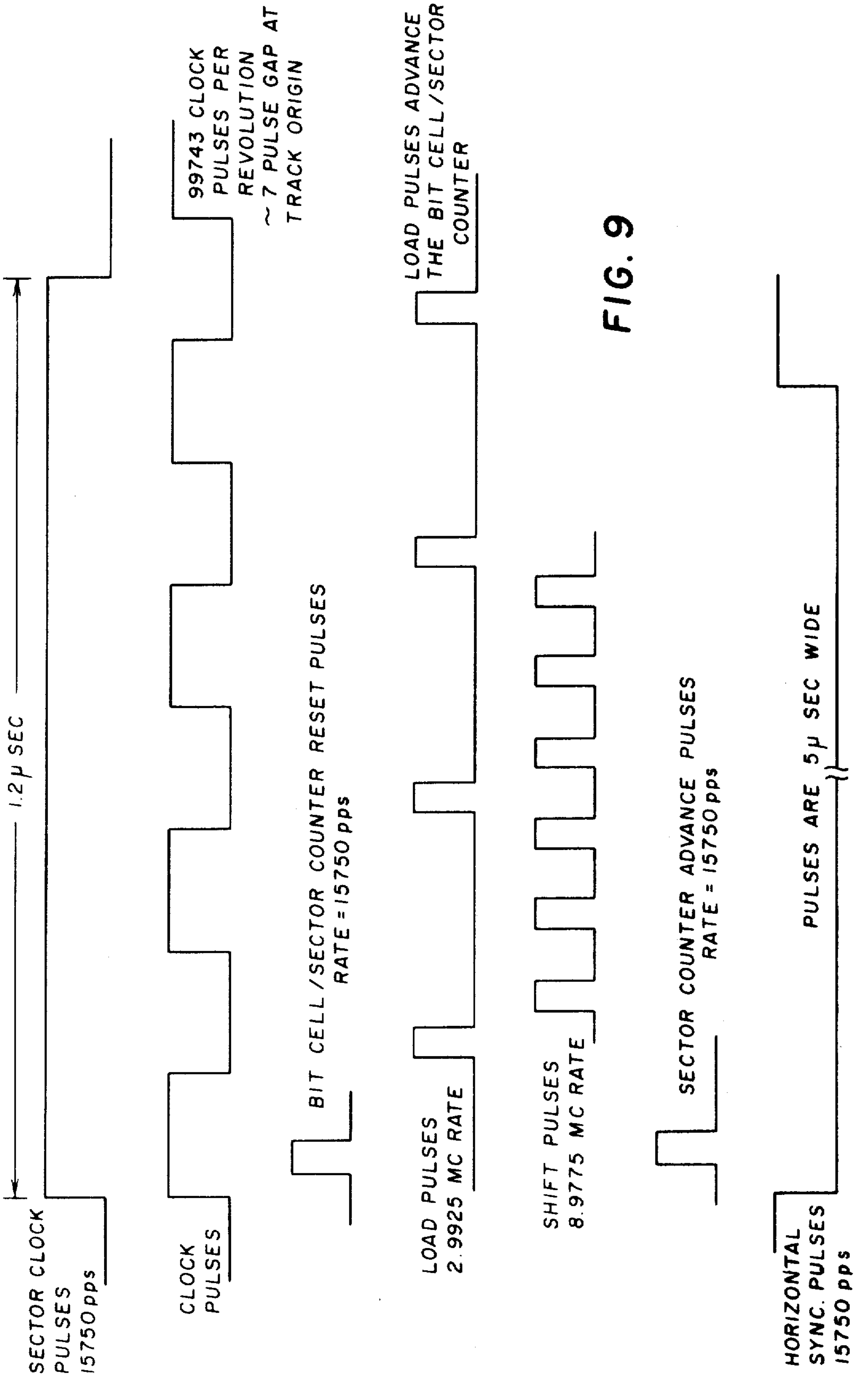
FIG. 9 is a time diagram similar to FIG. 8 at the instant of generation of a sector pulse (except for the sector located at the track origin).

FIG. 9 shows the timing diagram at any sector pulse except the sector starting at the track origin.

To get a vertical sync pulse at exactly 180° from the track origin, use is made of coincidence when the sector counter reaches the number 262 and the bit cell/sector counter 90 reaches the number 95.

B. The Digital Disc

The disc 40 is a digital disc available from Data Disc, Inc. and consists of 45 data channels, 9 channels for line drawing capabilities, 6 spare channels, one clock track with 99743 clock pulses and a 7-pulse gap for the track origin pulse, and one sector track with 525 sector clock pulses. Spacing between adjacent sector clock pulses is exactly 190 clock pulses. The computer 20 feeds the data to the interface controller 38 and stores a complete trace in the core memory system 46. The core memory system 46 has a cycle time of 1 microsecond, while the disc 40 records information at a 3 MC rate. Therefore, 9 samples of information are stored in parallel in the core memory system 46 (45-bit word). These 9 samples are read simultaneously into fifteen 4-bit shift registers 68 and the disc 40 records 3 samples (15-bit words) at a 3 MC write clock rate on to 15 parallel tracks.

Figure 10:
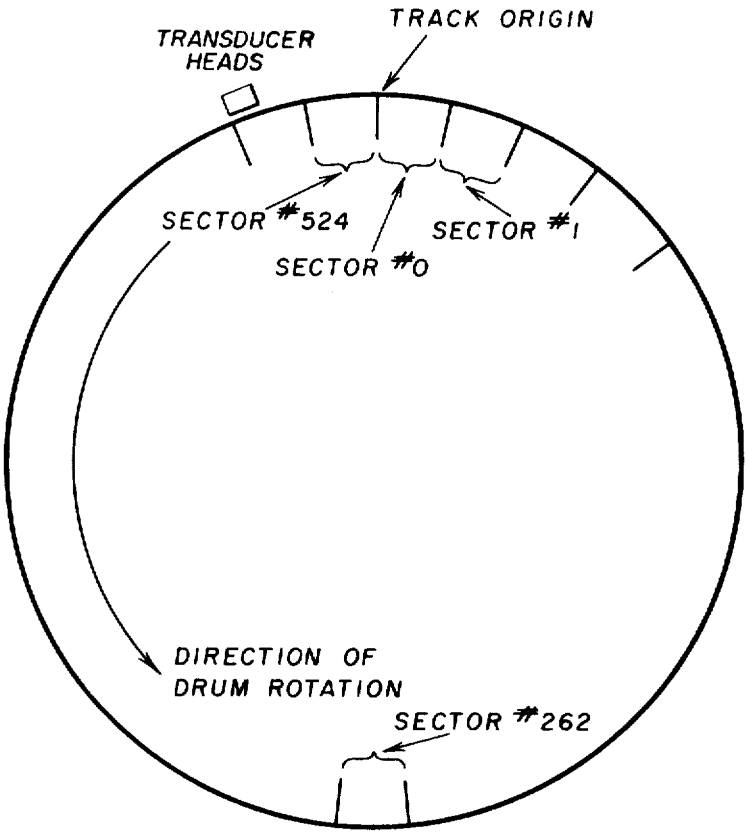
FIG. 10 is a diagram of the sector layout on the digital disc.

FIG. 10 shows the sector layout on the digital disc which has:

525 sectors around circumference of disc 190 bit cells per sector 1 bit cell for every clock pulse 525 × 190 = 99750 clock pulses around circumference of disc except for 7 missing clock pulses, to create a track origin pulse.

The computer 20 has to send the following information to the controller 38 before a trace can be recorded on the disc 40:

1. A Sector address. Each trace has to be recorded in a specific sector. All odd numbered traces are stored serially on one-half of the disc 40, and all even numbered traces are recorded serially on the other half.
2. A Write command. This enables the data to be recorded in the proper sector on the disc 40. The write command automatically prevents the disc 40 from reading at the same time, but the ratio of record time to read time is so small that it does not make any difference to the eye.

During playback, the read clock signal will clock the 15-bit parallel output into the five 4-bit shift registers 70. The output of shift registers 70 will be a 5-bit word (sample) at a 9 MC rate, and this output is fed into the D/A converter 42. The controller 38 generates the load and shift pulses for the shift registers 70 from the read clock signal. The speed of the disc 40 is 1800 rpm or 30 revolutions per second; so each revolution produces one complete frame of information for display on the monitor 44. The 525 sector clock pulses provide the start for the horizontal sync and blanking pulses which occur at a rate of 15750 pulses per second. The track origin provides the start for one of the vertical sync pulses necessary per revolution. A comparison network in the controller 38 determined when the disc 40 is exactly 180° from the track origin and produces another vertical sync pulse to create a definite interlace.

C. The D/A Converter

The D/A converter 42 is a modified Epsco Model 0029. Maximum conversion rate is 10 MC.

The digital disc 40 during the read process reads 15 bits in parallel (3 samples) at a 3 MC rate into the five 4-bit shift registers 70. The output of these shift registers 70 is a 5-bit parallel binary word at a 9 MC rate. This shift register output is fed through level shifters to the input of the D/A converter 42. Delayed shift pulses are used to form strobe pulses in the converter 42.

The analog output of the converter 42 varies between plus and minus 5 volts, depending upon the binary value of the input which is in the 1' complement. The analog output of the converter 42 is fed to the video input of the monitor 44.

D. High Resolution TV Monitor

The monitor 44 is a modified Conrac TV Monitor Model CQF which was modified for 525 line, 60 fields per second operation. Both horizontal and vertical sync pulse inputs are external inputs separated from the video signal. The monitor shows 48 lines per inch and the display area is approximately 10 inches × 15 inches. This allows us to show 480 traces with 500 samples per trace and 5 bits per sample. The sector clock in conjunction with pulse shaping circuits of the interface controller 38 provides the monitor 44 with horizontal sync pulses at a rate of 15750 pulses per second.

Figure 11:
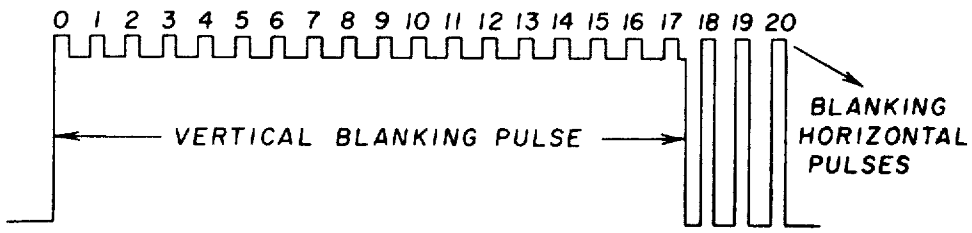
FIG. 11 is a timing diagram of the waveforms for the vertical and horizontal blanking pulses at the start of the track origin of the digital disc.

The track origin channel on the disc 40 is fed to pulse shaping circuits in the interface controller 38 and produces one of the two vertical sync pulses per disc revolution. Each half of the disc stores one field and for every revolution of the disc 40, one frame is created on the monitor 44. The other necessary vertical sync pulse is produced by a circuit in the interface controller 38 that counts sectors up to 525 and a bit cell/sector counter 90 which counts the 190 clock pulses per sector. In this manner we can produce a sync pulse exactly 180° from the track origin. FIG. 11 shows the vertical blanking pulse and the horizontal blanking pulses at the track origin start.

The blanking pulses are created by feeding the respective sync pulses to the proper blanking circuit.

Figure 12:
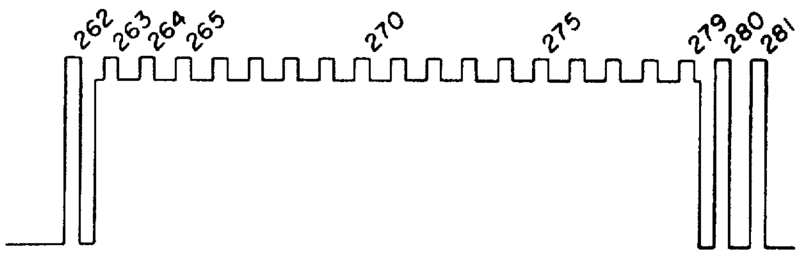
FIG. 12 shows the vertical and horizontal blanking pulses at 180° from the track origin.

FIG. 12 shows the blanking pulses at exactly 180° from the track origin.

The start of the second vertical sync pulse is exactly halfway between Sector No. 262 and 263. This provides a definite interlace for the two fields, forming one frame on the monitor.

The video signal produces the intensity modulation signal for the cathode ray beam. Since we use a 5-bit sample, we can theoretically get 32 levels of intensity. Because of the limited resolving power of the eye, we do not need more than 5 bits per sample.

E. The Graphical Input Device

The graphical input device 45 is a Model 2020 Grafacon digital tablet with a pen-like stylus. An operator uses the pen-like stylus to input lines, curves, points, etc. so that zones of interest may be displayed in superposition on a seismic cross section.

Although the stylus continuously picks up coordinates, data input can be controlled by the operator; pressing down on the stylus actuates a switch within the stylus. To use the graphical input device for line drawing, the digital program must go through the sequence listed below:

1. Program selects the graphical input device.
2. Computer 20 sends input request signal. The combination of input device selection and input request lights a visual indicator reading "Press Stylus".
3. When the operator presses the stylus, an $x$, $y$ coordinate is loaded into the output register of the graphical input device in 220 microseconds.
4. When the data ready pulse in the graphical input device becomes a "1", the 10 lower order bits are transferred from its output register to the input line of computer 20.
5. The controller 38 sends an input ready signal to computer 20.
6. Computer 20 accepts input ready, stores 10 bits of information, and drops the input request line.
7. The computer 20 sets up the second input instruction and issues another input request.
8. As soon as the next input request pulse appears, the 10 upper bits are transferred from the output register of the graphical input device 45 to the computer input time.
9. The interface controller 38 sends another input ready signal.
10. The computer 20 accepts the input ready signal, stores the 10 upper bits, and drops the input request line.
11. The program now changes the $x$ value to the proper sector number and the $y$ value to the proper bit cell/sector number.

Use formula:

bit cell/sector number = $y$ value/3 + remainder
for remainder = 0 load 3 bits 001
for remainder = 1 load 3 bits 010
for remainder = 2 load 3 bits 100

12. Next, the computer 20 sends the code for the address register 51 of core memory system 46.
13. After acceptance, the computer sends an address to the address register 51. This address is the same as the sector number because we will use location 0 through 524 of the core memory system 46 for storing the bit cell/sector number and the remainder for all traces to be displayed.
14. Computer 20 sends the code for memory clear/write cycle.
15. After acceptance, computer 20 sends the bit cell/sector number and the remainder. The bit cell/sector number determines at which place in the sector the remainder will be recorded.

The remainder carries the actual line information. This information is now in core storage location in core memory 50 equal to the sector number in which the remainder will be recorded. This information will ultimately produce one bright dot on the monitor. The information ready pulse will start an initiate clear/write cycle (1 microsecond duration).

Meanwhile, the system has been reading the storage location 0–524 of core memory 50 in synchronism with the sector counter 60 and displays each one of these dots for every revolution of the disc 40. To automatically display core locations 0–524, the core memory 50 must be in:

1. Read/restore mode.
2. Random mode (sequential) (Do not select code for sequential).
3. Not in the clear/write mode.
4. Core line display mode.
5. The address register 51 is loaded with the sector counter output every sector advance pulse.
6. The output of the memory (bit cell/sector number) is compared with the output of the bit cell/sector counter. At Coincidence of the two registers, a load pulse and 3 shift pulses are created.

The load pulse loads the remainder (001, 010, 100) in the 4-bit shift register 68. The three shift pulses shift the remainder out to a one-shot multivibrator whose output is fed into the video input.

If the program at this time has sent a read/restore code and a core line display code, then we can go back to step 2 and repeat this loop until the operator decides he has enough points and accepts the line. If he does not like part of the line, all he will have to do as far as the display is concerned is to draw that piece of the line where he wants it. The system automatically effects erasure of the old points in question and stores the new ones.

Figure 16:
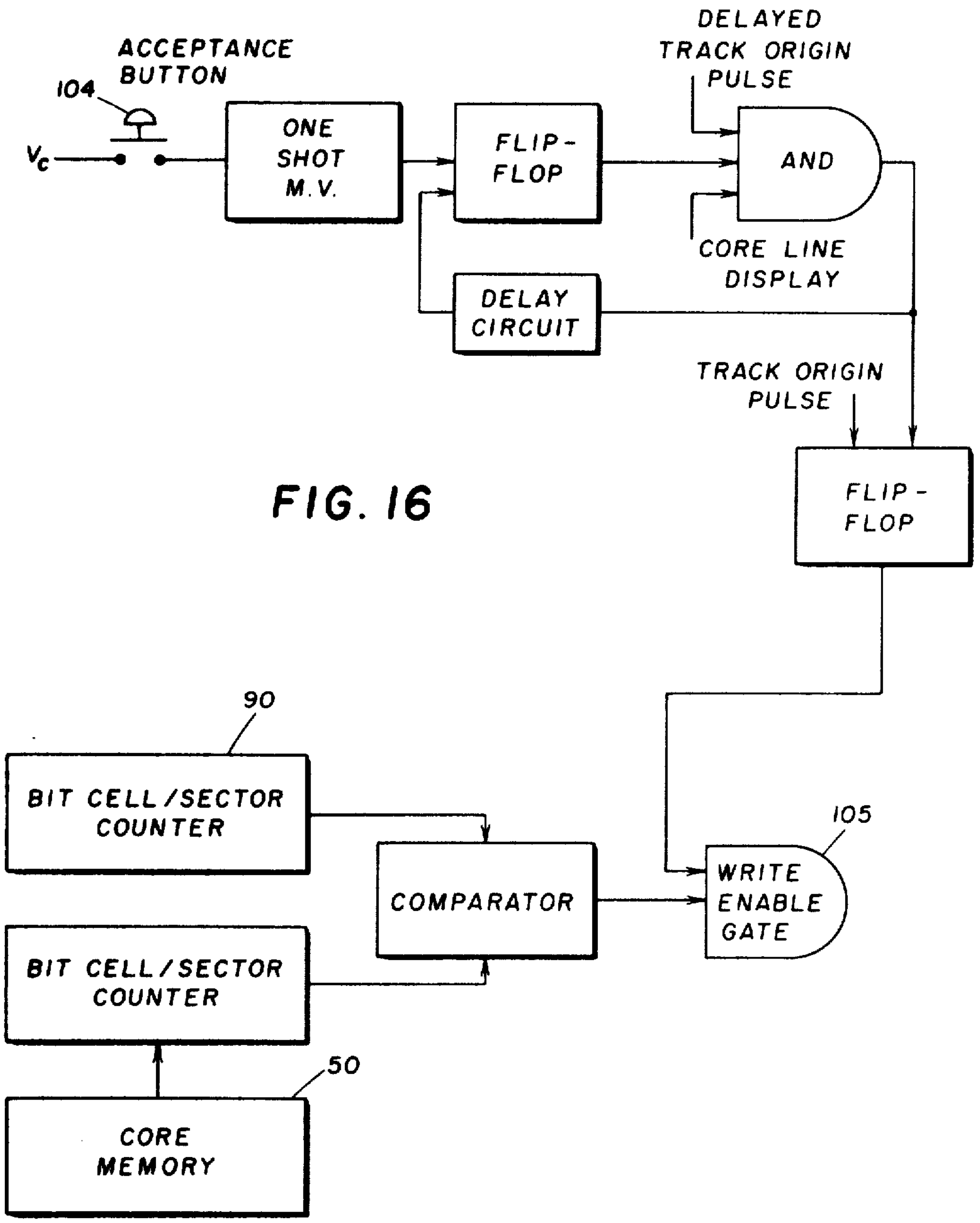
FIG. 16 is a block diagram of the circuits used in inserting data points through the graphical input device.

Referring to FIG. 16, when the operator pushes the accept button 104, all the data for that particular line which have been stored in core locations 0–524 must be recorded on disc 40 at the proper time. The write enable gate 105 should show a "1" only at the time of coincidence between the bit cell/sector number stored in core memory 50 and the bit cell/sector counter 90. So, the write enable gate 105 will be up for one bit cell of duration only. The one transducer head in three which has a "1" on its input will store a "1" on disc 40 at that time. All 480 sectors can show one bit cell/sector number sequentially and as each one of the sectors comes by the transducer heads for one revolution only, the remainder 001, 010, 100 will be recorded on disc 40.

F. Operation

1. Loading the Core Memory in the Controller from the Computer

Under control of the program the computer 20 sends the code to select the core memory address register 51, and the controller 38 signals its acceptance. Next, the computer 20 sends the address, and again the controller 38 signals the computer 20 that the address data have been stored. Now the computer 20 selects the code for sequential operation. Then the computer 20 sends the code for a memory clear/write cycle. The controller 38 sets the memory system 46 to the clear/write mode and signals the computer 20 to go to the next step in the program. The program now places the first data on the line. At this point the controller 38 continues to instruct the computer 20 to send more data until the 45-bit buffer register 52 is filled. Then the controller 38 automatically initiates a clear/write cycle, and the 45-bit word is stored in core memory system 46. The data available pulse from he core memory system 46 will switch the memory 50 from the random mode into the sequential mode at the right time, if the sequential mode has been selected. In the sequential mode the address register 51 of the memory system 46 is automatically advanced each time a clear/write cycle is initiated. The memory busy signal can "hold up" the process if the computer 20 can supply data faster than 1 microsecond per word. The program control in the computer 20 keeps track of how many samples have been set to the core memory 50. When all samples of a given trace have been stored in the core memory 50, the computer 20 will produce a termination code pulse. This pulse will reset all the necessary flip-flops in the controller 38. The data stored in core memory 50 are ready to be recorded in the proper sector on the disc 40.

2. Loading the Disc from the Core Memory in the Controller

The computer 20 will select the address register 51 in core memory system 46. The controller 38 will signal the computer 20 that the address register 51 has accepted its selection. Next, the computer 20 places the actual address on the line. The controller 38 stores the address in the address register 51. The controller 38 then signals the computer 20 that the address has been accepted. Now the computer 20 selects the code for sequential operation. The computer 20 then selects the code for the core memory read/restore mode and the controller 38 signals the computer 20 that the memory system 46 is now in the read/restore mode. The next step in the program selects the sector address register 64 and the controller 38 signals its acceptance. The program sends out the address and the controller 38 stores it in the sector address register 64 and signals the computer 20 that the address has been stored. Now the program sends the code to select the write mode for the digital disc 40. The controller 38 decodes this code and sets the write select flip-flop 99 to a logical "1". The controller 38 does not at this time signal the computer 20 to go to the next step in the program, but waits until the seismic trace has been stored in the proper sector on the digital disc 40 before signaling the computer 20 to execute the next program instruction. The controller 38 takes over and sets a 1st enable flip-flop 120 to prevent the start of recording a trace anywhere in the addressed sector. Thus, the start of recording is insured at the beginning of the addressed sector. If the write select flip-flop 99 goes to a "1" less than the length of one sector minus one microsecond ($\approx$62.5–1 microseconds), the trace will not be recorded until one revolution later of the disc 40. This, of course, can happen only to the first trace to be recorded. The second trace will be recorded exactly one-half revolution of the disc 40 later than the first trace. So we can easily record two traces per revolution or 60 traces every second. With a more complicated digital program, more than 60 traces can be recorded in one second.

Figure 13:
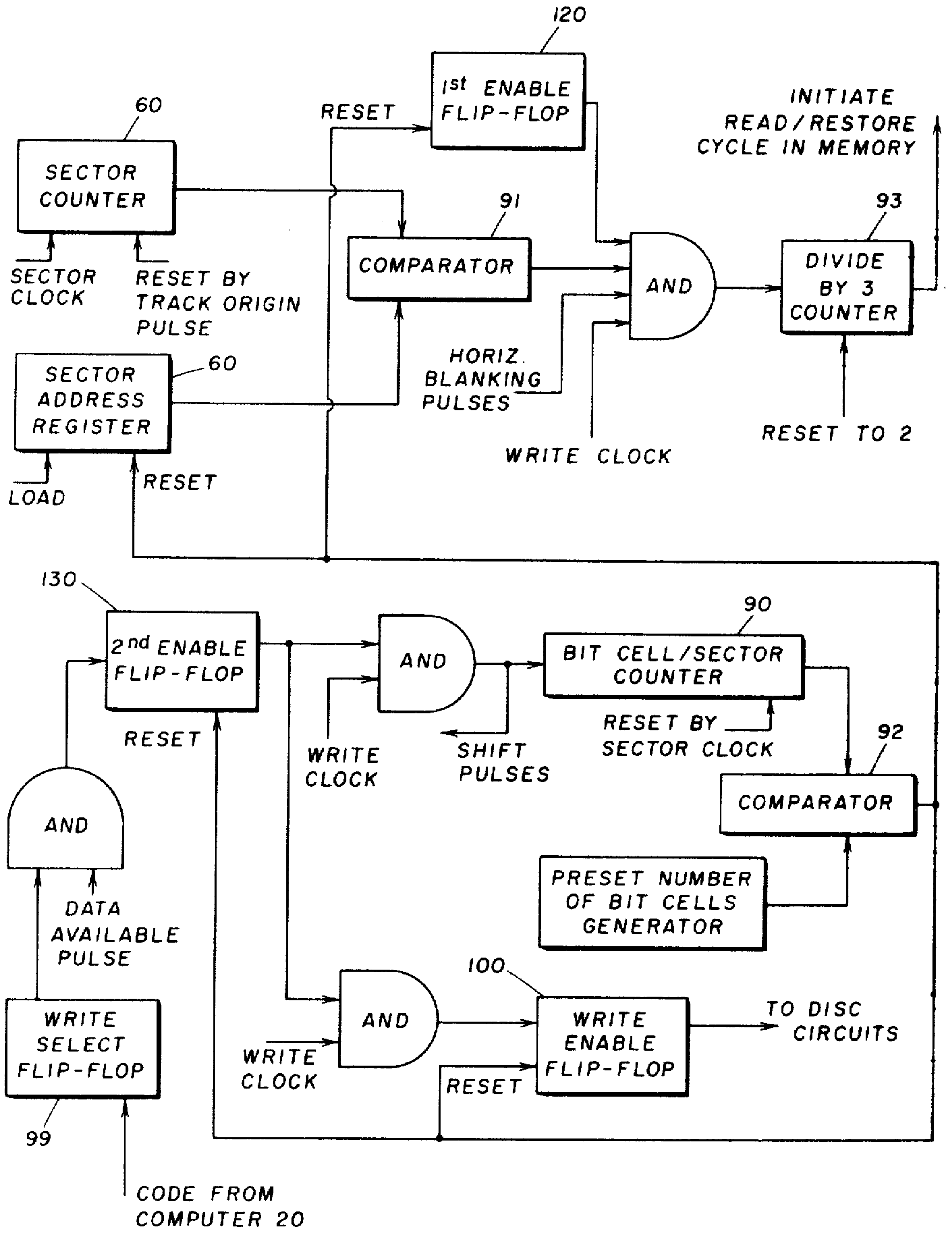
FIG. 13 is a block diagram of the logic circuits in the interface controller used for recording a seismic trace in the proper sector.

FIG. 13 shows the controller logic to record the trace in the proper sector. When the addressed sector shows up, the comparator 91 goes to a "1". The horizontal blanking pulse is a logical "0" for 5 microseconds' duration. The first write clock pulse after the horizontal blanking pulse has gone by will set the divide-by-3 counter 93 to count number 1. This starts the read/restore cycle in the memory. A data available pulse is sent 450 nanoseconds later by the memory system 46. This pulse sets the 2nd enable flip-flop 130 to a logical "1". Now the write clock pulses form shift pulses for the fifteen 4-bit shift registers 68. The data available pulses are shaped to become load pulses. The load pulses dump the 45-bit word from the core memory system 46 into the fifteen 4-bit shift registers 68 and each shift pulse records a 15-bit word in each group of 15-bit cells in the proper sector on the disc 40.

Meanwhile, each clock pulse advances the bit cell/sector counter 90 until the right amount of 15-bit words has been recorded in the sector. When the comparator 92 senses that this number has been reached, the 1st and 2nd enable flip-flops 120 and 130 are reset and also the write enable flip-flop 100, so no further data can be recorded on the disc 40. At this time the controller 38 signals the computer 20 to take the next program step.

3. Displaying the Disc Data on the Monitor

The display of the data which have been recorded on the disc 40 is automatic without control of the computer.

Figure 14:
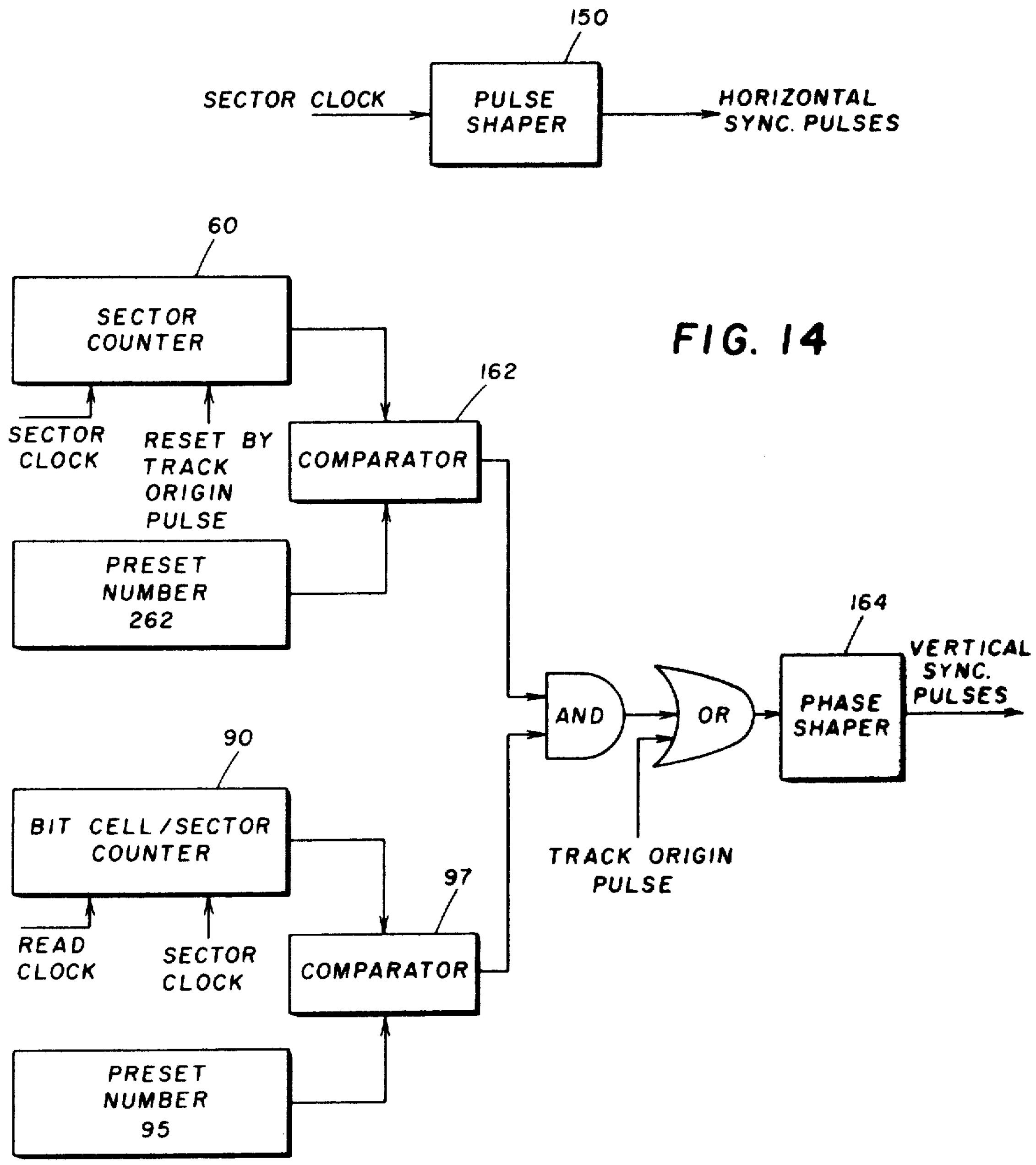
FIG. 14 is a block diagram of the circuits in the interface controller used for generating horizontal and vertical sync pulses for the display monitor.

When the disc 40 is not in the write mode, it is automatically in the read mode. The track origin pulse starts one complete revolution of the disc 40 and one complete frame of display on the monitor 44. The track origin pulse resets the sector counter 60 (see FIG. 14) and also produces one vertical sync pulse during each revolution of the disc 40.

The sector clock pulses are shaped by pulse shaper 150 to provide horizontal sync pulses. They produce 525 sync pulses for every revolution of the disc.

Figure 15:
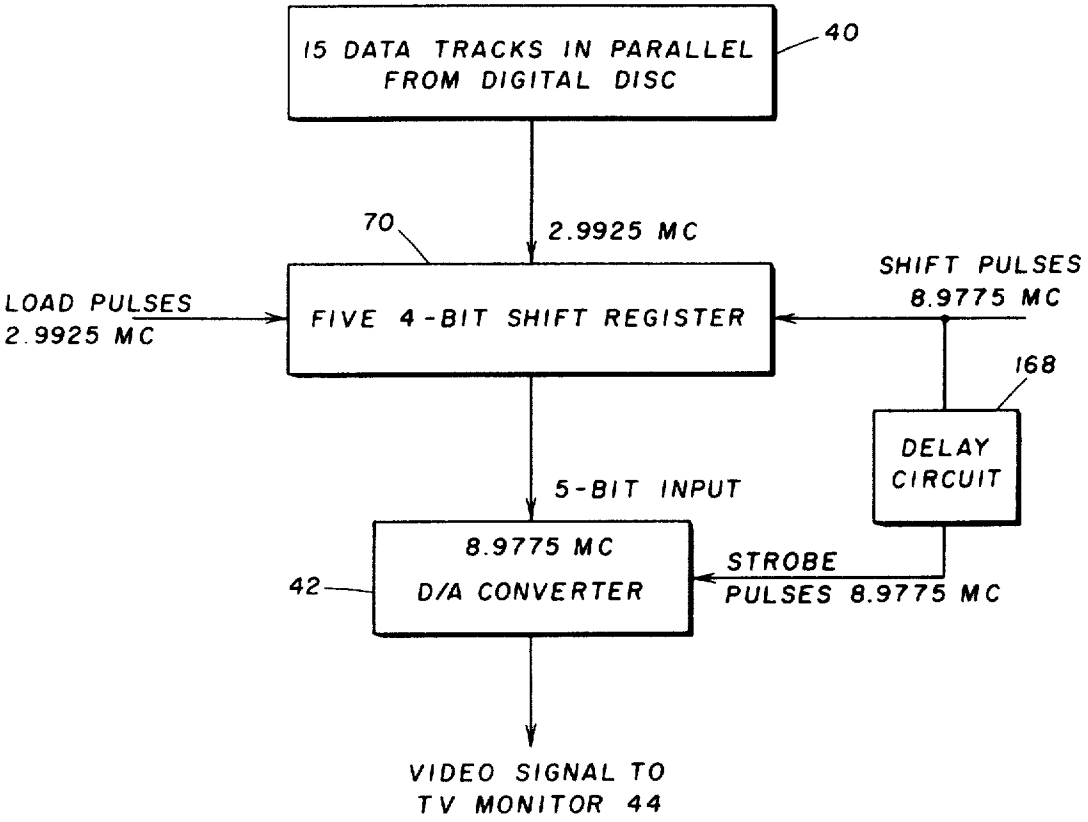
FIG. 15 is a block diagram of the data flow to the display monitor.

To produce a vertical sync pulse 180° from the track origin, the sector clock pulses advance the sector counter 60 one count for each pulse. When the counter reads 262, the comparison network 162 will produce a logical "1". At the beginning of each sector, the bit cell/sector counter is reset and receives a maximum of 190 clock pulses during the length of any one sector. When the bit cell/sector counter 90 reaches the number 95 as sensed by comparator 97, the pulse shaper 164 receives a second pulse which is exactly 180° from the track origin pulse on the disc and produces a vertical sync pulse. This pulse will start the second field of each frame of display. FIG. 15 shows the data path in block diagram. The disc reads out 15 bits in parallel at a 3 MC rate.

Each read clock pulse produces a load pulse which stores all 15 bits at one time in the five 4-bit shift registers 70. The load pulse is sent through a delay circuit 168 to produce three shift pulses. The spacing between the shift pulses is equal to one-third of the width of a clock pulse.

Each shift pulse places a 5-bit word on the data line to the D/A converter 42 and each strobe pulse reads these 5-bit words into the D/A switch network. The output of the D/A converter 42 is the analog video signal which intensity modulates the electron beam in the monitor 44.

The invention claimed is:

1. A video system for displaying recorded digital data comprising:

a cathode ray tube display device including means for sweeping an electron beam in a raster scan, said display device having a horizontal sync circuit triggered externally and a vertical sync circuit triggered externally and separately from said horizontal sync circuit, a cyclical storage device for storing said digital data on a recording medium and for reproducing timing signals stored on said recording medium, a digital-to-analog converter, means synchronized with said timing signals for transferring said data from said cyclical storage device to said digital-to-analog converter to produce an analog video signal which is applied to intensity modulate the electron beam of said cathode ray tube device, means synchronized with said timing signals for generating a horizontal sync signal and a vertical sync signal, and means for applying said horizontal sync signal to said horizontal sync circuit and for applying said vertical syne signals to said vertical sync circuit for sweeping said electron beam in said cathode ray tube display device in horizontal sweeps synchronized with the transfer of data and in vertical sweeps synchronized with the transfer of data from said cyclical storage device.

2. The system defined by claim 1 wherein the data to be displayed is multitrace seismic data representing a cross section of the earth, each trace of said seismic data being represented by one horizontal sweep of the raster scan of said cathode ray tube device.

3. The system defined by claim 1 wherein said cyclical storage device comprises a rotatable disc.

4. The system defined by claim 1 wherein said cathode ray tube display device comprises a television-type monitor with a 525–line raster scan.

5. The system recited in claim 1 wherein said means for transferring said data from said cyclical storage device to said digital-to-analog converter comprises a set of shift registers for transferring data to said digital-to-analog converter at a greater rate than that at which said data is being read from said cyclical storage device.

* * * * *